(12) United States Patent
Finch et al.

(10) Patent No.: US 8,747,953 B2
(45) Date of Patent: Jun. 10, 2014

(54) STABLE REACTIVE THERMOSETTING FORMULATIONS OF REDUCING SUGARS AND AMINES

(75) Inventors: William Christopher Finch, Ambler, PA (US); Charles James Rand, Philadelphia, PA (US); C. Damien Rodowski, Downingtown, PA (US); Barry Weinstein, Dresher, PA (US); Drew Elliot Williams, Blue Bell, PA (US)

(73) Assignee: Rohm and Haas Company, Philadelphia, PA (US)

( * ) Notice: Subject to any disclaimer, the term of this patent is extended or adjusted under 35 U.S.C. 154(b) by 141 days.

(21) Appl. No.: 13/305,776

(22) Filed: Nov. 29, 2011

(65) Prior Publication Data

US 2012/0135152 A1   May 31, 2012

Related U.S. Application Data

(60) Provisional application No. 61/418,068, filed on Nov. 30, 2010, provisional application No. 61/538,386, filed on Sep. 23, 2011.

(51) Int. Cl.
  *B05D 3/10* (2006.01)
  *C09J 179/02* (2006.01)

(52) U.S. Cl.
  USPC ............... 427/389.9; 427/385.5; 527/312

(58) Field of Classification Search
  USPC .................................. 527/312
  See application file for complete search history.

(56) References Cited

U.S. PATENT DOCUMENTS

| | | | |
|---|---|---|---|
| 2,215,825 | A | 9/1940 | Wallace et al. |
| 3,274,012 | A | 9/1966 | Cooper et al. |
| 3,513,001 | A | 5/1970 | Worthington et al. |
| 4,107,379 | A | 8/1978 | Stofko |
| 4,183,997 | A | 1/1980 | Stofko |
| 4,524,164 | A | 6/1985 | Viswanathan et al. |
| 5,371,194 | A | 12/1994 | Ferretti |
| 5,661,213 | A | 8/1997 | Arkens et al. |
| 5,895,804 | A | 4/1999 | Lee et al. |
| 5,905,115 | A | 5/1999 | Luitjes et al. |
| 6,262,159 | B1 | 7/2001 | Dreher et al. |
| 6,299,936 | B1 | 10/2001 | Reck et al. |
| 6,753,361 | B2 | 6/2004 | Kroner et al. |
| 7,026,390 | B2 | 4/2006 | O'Brien-Bernini et al. |
| 7,195,792 | B2 | 3/2007 | Boston et al. |
| 7,199,179 | B2 | 4/2007 | Clamen et al. |
| 7,470,520 | B1 | 12/2008 | Elashvili |
| 7,494,566 | B2 | 2/2009 | Carroll et al. |
| 7,579,289 | B2 | 8/2009 | Clamen et al. |
| 7,655,711 | B2 | 2/2010 | Swift et al. |
| 7,766,975 | B2 | 8/2010 | Clamen et al. |
| 7,893,154 | B2 | 2/2011 | Van Herwijnen et al. |
| 2005/0130261 | A1 | 6/2005 | Wils et al. |
| 2006/0239889 | A1 | 10/2006 | Lewis et al. |
| 2007/0123679 | A1* | 5/2007 | Swift et al. ............... 527/312 |
| 2007/0123680 | A1 | 5/2007 | Swift et al. |
| 2008/0051539 | A1 | 2/2008 | Kelly |
| 2008/0191179 | A1 | 8/2008 | Bernard et al. |
| 2009/0170978 | A1 | 7/2009 | Kelly |
| 2009/0324915 | A1 | 12/2009 | Swift et al. |
| 2010/0087571 | A1 | 4/2010 | Jackson et al. |
| 2010/0222459 | A1 | 9/2010 | Kelly et al. |
| 2010/0282996 | A1 | 11/2010 | Jaffrennou et al. |
| 2011/0039111 | A1 | 2/2011 | Shooshtari |
| 2011/0040010 | A1 | 2/2011 | Shooshtari |
| 2011/0086567 | A1* | 4/2011 | Hawkins et al. ........... 442/327 |
| 2011/0210280 | A1 | 9/2011 | Jaffrennou |

FOREIGN PATENT DOCUMENTS

| | | |
|---|---|---|
| DE | 1905054 | 8/1969 |
| EP | 0020004 A1 | 12/1980 |
| EP | 0044614 A2 | 1/1982 |
| GB | 2078805 A | 1/1982 |
| JP | 49071121 A | 7/1974 |
| JP | 2005239706 A | 9/2005 |
| WO | 2007014236 A2 | 2/2007 |
| WO | 2008091256 A1 | 7/2008 |
| WO | 2009004261 A2 | 1/2009 |
| WO | 2009006532 A1 | 1/2009 |
| WO | 2009019232 A1 | 2/2009 |
| WO | 2009019235 A1 | 2/2009 |
| WO | 2009149334 A2 | 12/2009 |
| WO | 2010/106181 A1 | 9/2010 |
| WO | 2011019597 A1 | 2/2011 |
| WO | 2011019598 A1 | 2/2011 |
| WO | 2011044490 A1 | 4/2011 |

OTHER PUBLICATIONS

Micheel et al., "D-Glucose Derivatives of Proteins," Chemical Abstracts, vol. 51, No. 4, Feb. 1, 1957, pp. 1-2.

Potman, R. P., et al., "Mechanistic studies of the Maillard reaction with emphasis on phosphate-mediated catalysis," In thermal generation of aromas; Chapter 17; Parliment, T., et al., ACS Symposium Series, American Chemical Society: Washington, DC, 1989, pp. 182-195.

* cited by examiner

*Primary Examiner* — Vu A Nguyen
(74) *Attorney, Agent, or Firm* — Andrew E. C. Merriam

(57) ABSTRACT

The present invention provides stable aqueous thermosetting binder compositions having a total solids content of 15 wt. % or higher, preferably, 20 wt. % or higher, and having extended shelf life comprising one or more reducing sugar, one or more primary amine compound, and one or more stabilizer acid or salt having a pKa of 8.5 or less. The total amount of stabilizer used may range from 5 to 200 mole %, based on the total moles of primary amine present in the binder. The stabilizer may be an organic stabilizer chosen from a monocarboxylic acid, a dicarboxylic acid, a fatty acid, an acid functional fatty acid ester, an acid functional fatty acid ether, or an inorganic stabilizer chosen from a mineral acid, a mineral acid amine or ammonia salt, and a Lewis acid, and mixtures thereof. The compositions can be used to provide binders for substrate materials including, for example, glass fiber.

10 Claims, No Drawings ions of reducing sugars
STABLE REACTIVE THERMOSETTING FORMULATIONS OF REDUCING SUGARS AND AMINES The present invention relates to shelf-stable, high solids compositions of formaldehyde-free thermosetting binders form carbohydrates and amines which cure rapidly or with low energy input requirements.

The most common thermosetting resins are formaldehyde condensates such as phenol formaldehyde (PF) urea formaldehyde (UF) melamine formaldehyde (MF) and combinations. Once cured, substrates coated with these thermosetting resins resist wetting. These thermosetting resins are highly reactive. Their reactivity is further enhanced by the addition of activators such as ammonium salts of mineral acids. However, once activated, formaldehyde condensate resins have a particularly limited "pot-life" and must be applied shortly after activating and formulating. To address these pot-life issues, these resins are shipped and stored under refrigeration and are commonly manufactured at a location in close proximity to their use.

In general, makers of thermosetting formulations from formaldehyde condensates, acrylic thermosetting resins and thermosetting resins from renewable resources provide their products in the form of concentrated (>50 weight % solids) homogeneous aqueous solutions which can be diluted, and, if needed be, activated just prior to use.

The first generation of safer and less toxic formaldehyde free thermosetting resins, especially the aqueous renewable thermosetting resins, such as the melanoidin producing and carbohydrate containing thermosets, have acceptable stability. These resins can be used in many applications previously dominated by formaldehyde thermosets, such as insulation, wood composites and laminate and fiberglass mat products. However, such carbohydrate containing thermosetting resins cure too slowly under economical conditions, and, once applied and cured provide substrates coated with inadequate ability to resist wetting. For example, US2007/0123679, and US2007/0123680 disclose melanoidins of ammonium salts of organic acids with reducing sugars. Such thermosetting binders enjoy stability above 50 wt % solids, but are not very reactive and, thus, require large amounts of energy to assure cure and mechanical properties derived from cure. Also substrates coated with these cured resins do not resist wetting. Furthermore, these publications do not identify low energy curable binders.

More recently, the present inventors have disclosed thermosetting binders comprising reducing sugars, particularly dextrose syrups and xylose or hemicelluloses, e.g. from wood sugars, that form reactive thermosetting solutions when combined with diamines, e.g. 1,6-hexamethylene diamine (HMDA). The xylose-diamine formulations are particularly reactive. However, it is difficult to provide this thermosetting resin in higher solids aqueous formulations, e.g. >25 wt. %. In fact, concentrated, e.g. >30 wt. %, xylose and dextrose formulations with HMDA both gel immediately or within 1-2 hours of preparation. This creates a severe problem for manufacturing and shipping of these novel thermosetting formulations.

In accordance with the present invention, the inventors have sought to solve the problem of providing a low energy curable, sufficiently shelf-stable, high solids thermosetting binder formulation from renewable materials. Such a solution enables the economical long distance supply of rapid cure thermosetting formulations to the end user.

STATEMENT OF THE INVENTION

In accordance with the present invention, stable aqueous thermosetting binder compositions with extended self life comprise one or more reducing sugar, preferably, a 5-carbon or a 6-carbon monosaccharide, one or more primary amine compound, preferably, a diprimary diamine or a polyprimary amine, and one or more stabilizer acid or salt having a pKa of 8.5 or less, preferably 7.5 or less, wherein the number of equivalents of primary amine relative to the number of equivalents of carbonyl groups, e.g. as aldehyde or ketone groups, in the reducing sugar ranges from 0.125:1 to 10:1.

The stabilizer may be an organic stabilizer or an inorganic stabilizer. Organic stabilizers may be chosen from a monocarboxylic acid, a dicarboxylic acid, a $C_{12}$ to $C_{36}$ fatty acid, an acid functional $C_{12}$ to $C_{36}$ fatty acid ester, an acid functional $C_{12}$ to $C_{36}$ fatty acid ether, and mixtures thereof, preferably, a monocarboxylic acid, an acid functional fatty acid ester compound, such as but not limited to mono- and di-glycerides, an acid functional fatty acid ether compound. Inorganic stabilizers may be chosen from a mineral acid, a mineral acid amine salt, a mineral acid ammonia salt, and a Lewis acid, preferably an aluminum Lewis acid, and mixtures thereof. Preferably, the inorganic stabilizer is an amine or ammonium salt of an inorganic acid, such as ammonium bicarbonate, ammonium dihydrogen phosphate, and amine sulfates. More preferably, the stabilizer is a fugitive acid stabilizer which is volatile under use conditions, such as, for example, acetic acid, ammonium bicarbonate and citric acid. Any of the stabilizers may also be mixed with a fatty acid, a fatty acid ester, a fatty acid ether compound.

The total amount of the one or more inorganic and/or organic stabilizer used may range from 5 to 200 mole %, based on the total moles of primary amine present in the binder, or 10 mole % or more, or, preferably, 20 mole % or more, or, preferably, up to 125 mole %, or, more preferably, up to 100 mol %.

The compositions of the present invention may be in concentrated form, having a total solids content of 15 wt. % or higher, or 20 wt. % or higher, preferably, 30 wt % or more, or, more preferably, 45 wt. % or more, or up to 90 wt. %, or, preferably up to 70 wt. %.

For water resistant applications, the preferred stabilizer is a mixture of a $C_{12}$ to $C_{36}$ fatty acid, an acid functional $C_{12}$ to $C_{36}$ fatty acid ester, an acid functional $C_{12}$ to $C_{36}$ fatty acid ether with any other stabilizer. The term "fatty acid" includes both saturated fatty acids such as but not limited to coconut acids and unsaturated fatty acids such as oleic linoleic acid and α-linolenic acid.

The compositions may further comprise an extender, such as a lignosulfonate, starch, gum, cellulosic, protein or vegetable oil in amounts of up to 25 wt. %, based on the total binder solids, preferably 20 wt. % or less.

In another aspect of the present invention, methods of using the stable aqueous thermosetting binder compositions comprised applying the binder compositions to or mixing them with a substrate and then heating the thus treated substrates or mixtures to cure the binder, for example, at from 100 to 400° C. Suitable substrates may include fibers, slivers, chips, particles, films, sheets, and combinations thereof. Suitable substrate materials may include, for example, glass, glass fiber, stone, stone fibers, composites and composite fibers or of organic and inorganic substrates, wood, or woody materials.

In yet another aspect of the present invention, products comprise the cured binder and substrate made according to the methods of the present invention.

As used herein, the phrase "alkyl" means any aliphatic alkyl group having one or more carbon atoms, the alkyl group including n-alkyl, s-alkyl, i-alkyl, t-alkyl groups. The aliphatic alkyl groups can be saturated or contain unsaturation, similarly they can be cyclic aliphatics containing one or more 5, 6 or seven member ring structures that are either saturated or contain unsaturation.

As used herein, the phrase "aqueous" or includes water and mixtures composed substantially of water and water-miscible solvents.

As used herein, the phrase "based on the total binder solids" refers to weight amounts of any given ingredient in comparison to the total weight amount of all of the non-volatile ingredients in the binder (e.g. saccharide(s), primary amines, capping agents, silanes, emulsion copolymer(s), polyols, and the like).

As used herein, the phrase "emulsion polymer" refers to a polymer that when combined with water or aqueous solvent forms a disperse phase of an aqueous emulsion.

As used herein the "pKa" of a stabilizer will be treated as the pKa of the most acidic proton of an acid stabilizer or the lowest pKa of the acid or salt stabilizer, i.e. the pKa of the strongest proton or base conjugate is understood.

As used herein, the term "poly(primary amine)" means any compound having three or more primary amine groups, such as tris(2-aminoethyl)amine and polyethyleneimine.

As used herein, the term "polymer" includes the term "copolymer", and, unless otherwise indicated, the term "copolymer" refers to polymers made from any two or more different monomers, including, for example, terpolymers, pentapolymers, homopolymers functionalized after polymerization so that two or more different functional groups are present in the product copolymer, block copolymers, segmented copolymers, graft copolymers, and any mixture or combination thereof. (Co)polymer means homopolymer or copolymer.

As used herein, the phrase "substantially formaldehyde-free" refers to compositions free from added formaldehyde, and which do not liberate substantial formaldehyde as a result of drying and/or curing. Preferably, such binder or material that incorporates the binder liberates less than 100 ppm of formaldehyde, more preferably less than 50 and most preferably less than 25 ppm of formaldehyde, as a result of drying and/or curing the binder.

As used herein, the term "substantially free of polycarboxylic acids" means that a composition contains less than 1.0 wt. % based on the total binder solids of polycarboxylic acids, including polyprotic polycarboxylic acids, e.g. citric acid, and polymeric polycarboxylic acids, e.g. acrylic or vinyl solution polymers having more than 10 wt. % of copolymerized carboxyl group containing monomers. As used herein, the term "polycarboxylic acids" excludes emulsion polymers having 10 wt. % or less of copolymerized carboxyl group containing monomers.

As used herein, the term "wood, or woody materials" include finely divided materials in any form, including shredded, sawdust, chips, shavings, flakes, or ground material from any wood feedstock, any part of wood, and any woody plant material, including softwood, hardwood, pulp, bark, bamboo, seed husks, nut shells and other hard plant or lignocellulosic materials.

As used herein, unless otherwise indicated, the term "weight average molecular weight" refers to the molecular weight of a substance as determined by size exclusion gel chromatography (SEC).

As used herein, "wt. %" or "wt. percent" means weight percent based on total binder solids of the binder composition as mixed, and prior to any cure. Dehydrated reducing sugars will be considered uncured in the form they are added to the compositions.

The singular forms "a," "an," and "the" include plural referents unless the context clearly dictates otherwise. Unless defined otherwise, technical and scientific terms used herein have the same meaning as is commonly understood by one skilled in the art.

Unless otherwise indicated, any term containing parentheses refers, alternatively, to the whole term as if no parentheses were present and the term without that contained in the parentheses, and combinations of each alternative. Thus, the term "(meth)acylate" encompasses, in the alternative, methacrylate, or acrylate, or mixtures thereof.

The endpoints of all ranges directed to the same component or property are inclusive of the endpoint and independently combinable. Thus, for example, a disclosed range of a ratio of from 0.125:1 or higher and up to 10:1, preferably 0.4:1 or higher, or, preferably, 0.8:1 or higher, or, preferably 1.0:1 or higher, or, preferably, up to 4:1 means any and all of from 0.125:1 to 10:1, from 0.125:1 to 1.0:1, from 0.125:1 to 4:1, from 0.125:1 to 0.4:1, from 0.4:1 to 10:1, from 0.4:1 to 1.0:1, from 0.4:1 to 4:1, from 0.4:1 to 0.8:1, from 0.125:1 to 0.8:1, from 0.8:1 to 1.0:1, from 0.8:1 to 4:1, from 1.0:1 to 4:1, from 0.8:1 to 10:1, from 1.0:1 to 10:1, and from 4:1 to 10:1.

Unless otherwise indicated, conditions of temperature and pressure are room temperature (~20-22° C.) and standard pressure, also referred to as "ambient conditions". The aqueous binder compositions may be dried under conditions other than ambient conditions.

The stability of binders comprising largely renewable materials from natural sources, such as vegetable feedstocks, is enabled through the aqueous binder compositions of the present invention. The aqueous binder composition has a stabilizer that is acidic enough to stabilize the composition even at a solids content 20 wt. % or more, based on the total binder solids, or, preferably, 30 wt. % or more. As used herein, the term "shelf stability" refers to a composition that has no visible precipitate, remains finely dispersed or dissolved in its aqueous medium, and remains flowable under ambient conditions. The aqueous compositions may have a shelf stability at a solids content of 30 wt. % or 1 day or longer, or 5 days or longer, or even 14 days or longer. In addition, stabilizers that are fatty acid, acid functional fatty acid esters, and acid functional fatty acid ethers meet the need to improve the water resistance of thermosetting binders from renewable materials. In addition, the present invention provides stabilized compositions such that the onset of cure is not adversely impacted when compared with their counterparts without any stabilizer. Finally, the compositions of the present invention produce during cure non-toxic or even harmless gaseous effluents, such as water and carbon dioxide, and can be tailored to produce more limited amounts of ammonia or no ammonia on cure.

The present invention stable aqueous thermosetting binder compositions comprising a total solids of from 25 to 95 wt. %, preferably, 30 wt. % or more, or, preferably, 40 wt. % or more, or, more preferably, 45 to 70 wt. %, based on the total weight of the aqueous binder.

The amount of the stabilizer used is inversely proportional to the pKa of the stabilizer compound. Preferred stabilizers have a pKa of 7.5 or less, or, more preferably, 7.0 or less.

Suitable inorganic stabilizers may include, for example, Lewis acids, such as aluminum sulfate mineral acids, like sulfuric acid; amine acid salts and ammonia acid salts. The Lewis acids useful in the present invention include metal salts, such as aluminum salts but do not include alkaline) metal salts, iron salts, or zinc salts. Preferably, the inorganic stabilizer is ammonium bicarbonate, sulfuric acid, ammonium nitrate or aluminum sulfate.

Suitable organic stabilizers may include, for example, any such compound or material which can be dispersed in aqueous media, such as, for example, mono- and di-carboxylic organic acid stabilizers, e.g. acetic acid, butyric acid and adipic acid; fatty acids, acid functional fatty acid esters or ethers. Preferred organic stabilizers are acetic acid, adipic acid and fatty acids, such as coconut acids and oleic acids.

To provide compositions that can cure at reduced temperatures, that cure in less time, or that have reduced cure energies, one or more fugitive stabilizers that flash off under application conditions may be used as the stabilizer. Citric acid, acetic acid and ammonium bicarbonate are examples of fugitive stabilizers. Fugitive stabilizers are useful in binder applications for any substrate for which the binders of the present invention can be used, including glass fiber, stone wool substrates and heat sensitive substrates, such as those comprising plastic fibers or particles. Fugitive stabilizers in effect will reduce the offgasing caused by heat curing the binder and thus may be useful for applications in high density substrates, and wood composites.

To enhance the water resistance of the binder, suitable organic stabilizers can be any $C_{12}$ to $C_{36}$, preferably, $C_{12}$ to $C_{24}$, fatty acid, or any acid functional a $C_{12}$ to $C_{36}$, preferably, $C_{12}$ to $C_{24}$ fatty acid ether or ester. Such molecules can be hydrolyzed from any natural source, such as a vegetable, plant or animal oil. Suitable compounds or molecules may be unsaturated fatty acids, such as oleic and linoleic acids or saturated acids, such as stearic acids. Examples include, but are not limited to, coconut acids from coconut oil, myristic acids from palm kernel oil, acids from nutmeg butter, and acids from flax oil, cottonseed and corn oil.

The aqueous binder compositions comprise one or more diprimary diamines or primary amine group containing compounds, including, for example, diprimary diamines, such as lysine and 1,6-hexamethylene diamine (HMD), and poly(primary amines), such as polyamines having a weight average molecular weight of 5,000 or less, preferably 3,800 or less, or, more preferably, 2,500 or less, e.g. polyethyleneimines, and reducing sugars chosen from reducing mono- and di-saccharides, their natural or synthetic stereoisomers or optical isomers, hydroxy, halo, alkyl, alkoxy or carbonyl substituted reducing mono and di-saccharides, and dehydrated forms of reducing mono and di-saccharides.

Preferred diprimary diamines or oligo(primary amine)s may have an amine equivalent weight of 400 or less, preferably 200 or less.

Other diprimary diamines may be chosen from aminoguanidine and oligomeric diprimary diamines.

The poly(primary amine)s may comprise polymers having 10 wt. % or more, or, preferably, 20 wt. % or more, of primary amine groups, such as ethylamines.

Suitable primary diamines and polyprimary polyamines may include, for example, alkyl diprimary or higher primary diamines, such as aliphatic primary diamines, such as aminoguanidine and its salts, e.g. aminoguanidine hydrochloride, putrescine, n-alkylenediamines, like ethylene diamine, hexamethylene diamines, and other alkylene di-amines; cycloaliphatic primary diamines, such as, for example, di-primary amine functional amino acids, such as lysine and aminoglycine; and aromatic di-primary amines, such as, for example, bis-(aminomethyl) cyclohexane (bisAMC), m-xylenediamine (MXD); polyamine polymers of the desired molecular weight, such as polyethyleneimines, polyethylenimine containing copolymers and block copolymers having 10 wt. % or more of primary amine groups, (co)polymers of n-aminoalkyl(meth)acrylates, such as aminoethyl methacrylate, polyguanidines, and any other (co)polymer which has at least 10 wt. %, preferably 20 wt. %, of primary amine groups. One suitable cycloaliphatic primary diamine is PRIMENE™ MD from Dow Advanced Materials, formerly the Rohm and Haas Company (Philadelphia, Pa.).

The number of equivalents of primary amine relative to the number of equivalents of carbonyl (as aldehyde or ketone) groups in the reducing sugar should range from 0.125:1.0 or higher and up to 10:1, preferably 0.4:1 or higher, or, preferably, 0.8:1 or higher, or, preferably 1.0:1 or higher, or, preferably, up to 4:1. A 1:1 equivalent ratio of primary amine to carbonyl in the reducing sugar equates to 50 mole % of di-primary diamine per one mole of a reducing sugar having one carbonyl group, e.g. dextrose.

In some applications, especially glass mat applications, the equivalent ratio of primary amine groups to carbonyl groups may range as low as 0.15:1 to 0.25:1.

The aqueous binder composition of the present invention comprises one or more reducing sugar, which may be a monosaccharide, disaccharide, mixtures comprising oligosaccharides or higher saccharides and reducing sugars, such as from plant and woody feedstocks, and mixtures thereof. A reducing sugar herein is any sugar that has an aldehyde or a ketone in its open chain form. This allows the sugar to act as a reducing agent, for example in a reaction with an amine. A sugar may be a reducing sugar when its anomeric carbon (the carbon linked to two oxygen atoms) is in the free form. Sugars may occur in a chain as well as a ring structure and it is possible to have an equilibrium between these two forms. Further, some keto sugars are reducing sugars because they may be converted to an aldehyde via a series of tautomeric shifts to migrate the carbonyl to the end of the chain. This pathway could become accessible during the thermal curing process.

Reducing sugars include all monosaccharides, whether aldose (containing an aldehyde) or ketose (containing a ketone). Reducing sugars include glucose, xylose, fructose, glyceraldehydes, lactose, arabinose and maltose. Accordingly, the reducing sugar component of the present invention may be a monosaccharide in its aldose or ketose form, including a triose, a tetrose, a pentose, a hexose, or a heptose. Glyceraldehyde and dihydroxyacetone are considered to be aldose and ketose sugars, respectively. Examples of aldotetrose sugars include erythrose and threose; and ketotetrose sugars include erythrulose. Aldopentose sugars include ribose, arabinose, xylose, and lyxose; and ketopentose sugars include ribulose, arabulose, xylulose, and lyxulose. Examples of aldohexose sugars include glucose (for example, dextrose), mannose, galactose, allose, altrose, talose, gulose, and idose; and ketohexose sugars include fructose, psicose, sorbose, and tagatose. Ketoheptose sugars include sedoheptulose. Most disaccharides are also reducing sugars. Other natural or synthetic stereoisomers or optical isomers of reducing sugars may also be useful as the reducing sugar component of the aqueous binder composition; for example, dextrose, which is one of the optical isomers of glucose. The reducing sugar component of the aqueous binder composition optionally may be substituted, for example with hydroxy, halo, alkyl, alkoxy, or other substituent groups; for example, dihydroxyacetone is a suitable keto substituted ketose. In addition, the reducing sugar can comprise a dehydrated form of a reducing mono- or di-saccharide, such as, hydroxymethyl furfural from dehydrogenated glucose.

The reducing sugars optionally may be substituted, for example, with hydroxy, halo, alkyl, alkoxy, carbonyl or other substituent groups.

Suitable reducing sugars may include, for example, fructose, glyceraldehydes, lactose, arabinose, maltose, glucose, dextrose, xylose and levulose. Further, a number of suitable reducing sugar sources may be used, such as corn syrup, high fructose corn syrup, hemicellulosics from corn cob, de-lignified wood and bamboo, and other fructose, xylose, and dextrose equivalents.

Preferred reducing sugars are 5-carbon and 6-carbon reducing sugars.

The 5-carbon reducing sugars of the present invention may have a formula weight of 500 or less atomic mass units. Preferred 5-carbon reducing sugars include, for example, xylose, arabinose and ribose. Other 5-carbon reducing sugars include, for example, deoxyribose.

Preferably, the 5-carbon reducing sugars may be in the form of admixtures containing polysaccharides having a higher formula weight, such as plant feedstocks containing 5-carbon reducing sugars or other arabinoxylan feed stocks which can generate 5-carbon sugars. These may include, for example, fermented or chemically treated hemicellulose, e.g. from wood or bamboo, enzymatically digested wheat bran, enzymatically digested corn cob, enzymatically digested corn fiber, and acid hydrolysis products of any of these plant feedstocks.

The aqueous binder compositions may further comprise one or more capping agent, such as a titanate, zirconate or aluminate, for example titanium lactate. Such capping agents may be used in the amount of from 0.5 to 5 wt. %, based on the total binder solids.

The aqueous binder compositions may further comprise one or more reducing agent to limit exotherm during cure, such as, for example, a (meta)bisulfite or a vicinyl diol, such as glycerin, ethylene glycol and propylene glycol.

The aqueous binder compositions may further comprise one or more extender such as, for example, lignins, lignocellulosics, starch, protein, such as soy protein or defatted soy flour, and vegetable oils.

The aqueous binder compositions may further comprise a vinyl emulsion or dispersion polymer having up to 10 wt. %, based on the total weight of copolymerized monomers, of copolymerized carboxyl group containing monomers. Such a polymer may be a (meth)acrylate copolymer having up to 5 wt. %, or, preferably, up to 3 wt. %, based on the total weight of copolymerized monomers of copolymerized carboxyl group containing monomers, such as methacrylic acid.

The aqueous binder compositions may further comprise 0.2 wt. % or more, or, preferably up to 5 wt. %, based on the total binder solids, of an organosilane. Examples of suitable silanes comprise coupling agents such as, for example, Silquest™ A-187 (manufactured by GE Silicones-OSi Specialties, located in Wilton Conn.); other amino silanes such as 3-aminopropyl dialkoxysilanes and 3-(2-aminoethyl)aminopropylsilanes; epoxy silanes such as glycidoxypropylsilanes, vinyl silanes and hydrophobic silanes.

In still another embodiment, the aqueous binder compositions may further comprise a phosphorous-containing accelerator or an esterification catalyst, such as an alkali metal hypophosphite, and alkali metal hydrogen phosphonate, mono and di alkali metal phosphonates, alkylphosphonic and arylphosphonic or phosphinic acids including their alkali metal salts. Suitable catalysts may be used in amounts of 0.1 wt. % or more, or up to 30 wt. %, based on the total binder solids, preferably, 4.0 wt. % or more or up to 20 wt. %.

To minimize the formaldehyde content of the aqueous composition, it is preferred, when preparing a polymer-containing formaldehyde-free curable composition, to use polymerization adjuncts and additives such as, for example, initiators, reducing agents, chain transfer agents, curing agents, biocides, surfactants, emulsifiers, coupling agents, antifoaming agents, dust suppressing agents, fillers and the like, which are themselves formaldehyde free, or do not contain or generate formaldehyde during binder formation, application or cure.

In another aspect, the present invention provides methods of using the binder comprising applying the binder to a substrate and drying and/or curing. In drying (if applied in aqueous form) and curing the curable compositions, the duration, and temperature of heating, will affect the rate of drying, ease of processing or handling, and property development of the treated substrate. Suitable heat treatment temperatures may range 100° C. or more, and up to 400° C. The preferred treatment is substrate dependant. Thermally sensitive substrates such as cellulose fibers may be treated at 130 to 175° C. while thermally less sensitive composites may be treated at 150 to 200° C. and thermally resistant substrates such as mineral fibers may be treated at 220 to 300° C. for the desired times necessary to effect cure. Preferably, heat treatment temperatures range 150° C. or higher; such preferred heat treatment temperatures may range up to 225° C., or, more preferably, up to 200° C. or, up to 150° C. In the methods of use, the composition components need not all be pre-mixed prior to application of the binder to the substrate. For example, one or more components may be applied to a non-woven substrate, followed by application of the other binder components of this invention either in aqueous or dried form. After application, the binder can be cured by heating the coated non-woven to a sufficient temperature where it cures on the substrate.

The binder can be applied to the substrate, such as, for example, a web of fibers, by any suitable means including, for example, air or airless spraying, padding, saturating, roll coating, curtain coating, beater deposition, coagulation or dip and squeeze application, and the resultant saturated wet web laying on a supporting wire or screen is run over one or more vacuum boxes to remove enough binder to achieve the desired binder content in the product or treated substrate.

Drying and curing can be done in two or more distinct steps, if desired. For example, the curable composition can be first heated at temperatures and for times sufficient to at least partially dry, but not fully cure the composition, followed by heating for a second time, at higher temperatures and/or for longer periods of time, to effect curing. Such procedures, referred to as "B-staging," can be used to provide binder-treated nonwovens, for example, in roll form, which can be cured later, with or without forming or molding into a particular configuration, concurrent with the curing process.

In making wood or woody material containing articles, the methods of the present invention comprise admixing the aqueous binder compositions with finely divided wood or woody materials, followed by pressing and heating to form the product. The methods may include drying the finely divided wood or woody materials at temperatures of from 20 to 185° C. prior to admixing them with the aqueous binder compositions, preferably from 75 to 125° C. Plywood may be made in alternative processes wherein the aqueous binder composition is applied to a wood layer or sheet and a wood layer or sheet is applied thereto, followed by pressing and heating, and, optionally, repeating to achieve the desired plywood thickness.

Suitable substrates for binder application may include, for example, textiles, including cotton, linen, wool, and synthetic textiles from polyester, rayon, or nylon, and superabsorbent fibers; vegetable or cellulosic fibers, such as jute, sisal, flax, cotton and animal fibers; as well as heat resistant substrates, such as metal; plastics; synthetic fibers, e.g. polyester, rayon, poly(acrylonitrile) (PAN), poly(lactic acid) (PLA), poly(caprolactone) (PCL), aramid fibers, polyimide fibers, polyolefins and bi-component fiber comprising two or more fiber-forming polymers such as polypropylene and polyethylene terephthalate; mineral fibers, such as glass and mineral fibers, slag or stonewool, ceramic fibers, metal fibers, carbon fibers, and woven and non-woven fabrics made therefrom; and heat-sensitive substrates, such as wood and woody materials, paper and cardboard.

In yet another aspect, the present invention provides articles comprising substrates treated according to the methods of the present invention.

For each substrate described herein, there exists a corresponding aspect of the present invention wherein the aqueous binder composition in dried or cured form is present in a composite material or product. As defined herein, the term "composite material" refers to materials comprising: (a) a substrate material selected from fibers, slivers, chips, particles, films, sheets, and combinations thereof; and (b) the binder composition of the described embodiment.

The present invention provides wood or woody material containing articles made according to the methods of the present invention. Such articles include, for example, chip-, particle- or fibre-board, oriented strand board, plywood, bamboo plywood and composites, and other engineered wood, such as, for example, medium density fiberboard (MDF).

EXAMPLES

The names given to the following materials were used in the Examples, below:

ADM 97/71: (Corn Syrup 97/71 labelled as having a dextrose equivalent of 97 at 71 wt % solids Archer Daniels Midland, Decatur, Ill.;

1,6 HMD: (1,6-hexamethylenediamine), 99.5% ACROS Organics, Belgium;

Acetic Acid: Glacial, HOAc, EM Science, Gibbstown, N.J.;

Xylose: D+, 99+%, Acros Organics New Jersey;

Dextrose: D+, 99+%, Anhydrous, Acros Organics New Jersey;

bis-CHA: 1,3 Cyclohexane bis(methylamine) 99% cis/trans, ACROS Organics, Belgium;

Trifluoro acetic acid (TFA): 99% TFA, Sigma Aldrich, Milwaukee, Wis.;

DYTEK™ 70: 70 wt. % solids 1,6-hexamethylenediamine INVISTA, Wichita, Kans.;

DYTEK™ A: 2-methyl-1,5-pentane diamine, INVISTA, Wichita, Kans.

Sulfuric acid: ($H_2SO4$, 93-98%), Fisher Scientific Pittsburgh, Pa.;

Ammonium Bicarbonate or ABC: Fisher Scientific Pittsburgh, Pa.;

Aluminum Nitrate nonahydrate or $Al(NO_3)_3.9H_2O$: >99% Sigma Aldrich, Milwaukee, Wis.; and, ARBO™ SO1: Sodium Lignosulfonate, Tembec Inc., Temiscaming, Quebec.

Example 1

To a 25 ml glass vial equipped with a stirring bar was added 6.8 g. of water followed by 2.5 g. (21.5 mmol) of 1,6 HMD (was added 10.7 g. (40.9 mmol) of ADM 97/71 which was previously stored overnight in a 60° C. oven. The solution was stirred rigorously to assure homogeneity. The fluidity of the resultant solution was recorded as a function of time in Table 1

Example 2

To a 25 ml glass vial equipped with a stirring bar was added 6.8 g. of water followed by 2.5 g. (21.5 mmol) of 1,6 HMD.

Next, to this stirred solution 1.3 g. of glacial acetic acid (21.7 mmol) was added slowly dropwise. The addition of acetic acid was followed by 10.7 g. (40.9 mmol) of ADM 97/71 which as previously stated was stored overnight in a 60° C. oven. The resultant solution was stirred rigorously to assure homogeneity. The fluidity of the resultant solution was recorded as a function of time in Table 1.

Example 3

Comparison

To a 25 ml glass vial equipped with a stirring bar was added 6.0 g. of water followed by 6.3 g. (21.5 mmol) of xylose (42.0 mmol). After rigorously stirring for 10 to 12 minutes, 2.5 g. of 1,6-HMD (22.4 mmol) was added. The aqueous mixture gelled within 5 minutes after the fully addition of 1,6 HMD.

Example 4

To a 25 ml glass vial equipped with a stirring bar was added 3.0 g. of water followed by 6.3 g. (21.5 mmol) of xylose (42.0 mmol). The slurry was placed in a 60° C. oven for 30 minutes. Next, to a 25 ml glass vial equipped with a stirring bar was added 5.0 g. of water followed by 2.5 g. of 1,6 HMD (22.4 mmol). Next, with care, 2.4 g. of Trifluoroacetic acid (TFA) was added very slowly dropwise. The stirred solution was then combined with the slurry of xylose water which had cooled to room temp. The solution was capped and shaken. The mixture remained flowable and homogeneous for 1 hour, then gelled.

Example 5

To a 25 ml glass vial equipped with a stirring bar was added 6.8 g. of water followed by 3.1 g. (18.8 mmol) of DYTEK™ 70% and 1.3 g. of DI water. The vial was placed in an ice/bath and stirring maintain. Next, with extreme care 1.4 g. of concentrated sulfuric acid was added dropwise. After the extreme exotherm the slurry was removed from the cooling bath and became homogenous and fluid at room temperature. Next the solution of DYTEK™ 70 water and sulfuric acid was added to a slurry containing 6.6 g. of xylose (43.9 mmol) and 3.0 g. of water. The combined vials were shaken rigorously to homogeneity and allow to stand at room temperature. Although the solution darkened, it remained fluid for at least 2-weeks.

Example 6

To a 25 ml glass vial equipped with a stirring bar was added 7 g of DI water followed by 3.6 g of DYTEK™70. While this mixture was stirring 4.1 g of aluminum nitrate nonahydrate was slowly added. The vial was capped and shaken then allowed to settle to achieve a homogenous solution. To this solution 10.8 g of hot (~60° C.) ADM 97/71 was added with mixing. The material slowly darkened but remained fluid for at least 1 month.

Example 7

To a 25 ml glass vial was added 1.32 g (16.7 mmol) of ammonium bicarbonate followed by 2.76 g of DYTEK™ 70 (16.7 mmol of 1,6 HMD). To the resulting slurry was added 10 g of a 50% aqueous solution of xylose (33.3 mmol of xylose). The vial was capped and shaken to yield a homogeneous solution which remained fluid for at least 2 weeks.

Example 8

To a 25 ml glass vial was added 1.05 g (13.3 mmol) of ammonium bicarbonate followed by 2.76 g of DYTEK™ 70 (16.7 mmol of 1,6 HMD). To the resulting slurry was added 10 g of a 50% aqueous solution of xylose (33.3 mmol of xylose). The vial was capped and shaken to yield a homogeneous solution which remained fluid for 30 minutes.

Example 9

To a 25 ml glass vial was added 0.26 g (3.29 mmol) of ammonium bicarbonate followed by 2.76 g of DYTEK™ 70 (16.7 mmol of 1,6 HMD). To the resulting slurry was added 10 g of a 50% aqueous solution of xylose (33.3 mmol of xylose). The vial was capped and shaken to yield a homogeneous solution which remained fluid for 30 minutes.

Example 10

To a 25 ml glass vial was added 1.01 g of deionized water followed by 2.36 g (16.6 mmol) of bis-CHA. To the resulting solution was added 10 g of a 50% aqueous solution of xylose (33.3 mmol of xylose). The vial was capped and shaken to yield a homogeneous solution which gelled in less than 3.5 days.

Example 11

To a 25 ml glass vial was added 1.31 g (16.6 mmole) of ammonium bicarbonate followed by 1.01 g of deionized water and 2.36 g (16.6 mmol) of bis-CHA. To the resulting slurry was added 10 g of a 50% aqueous solution of xylose (33.3 mmol of xylose). The vial was capped and shaken to yield a homogeneous solution which remained fluid for at least 2 weeks.

Example 12

To a 25 ml glass vial was added 0.83 g of deionized water followed by 1.93 g (16.6 mmol) of DYTEK™ A. To the resulting solution was added 10 g of a 50% aqueous solution of xylose (33.3 mmol of xylose). The vial was capped and shaken to yield a homogeneous solution which gelled in less than 3.5 days.

Example 13

To a 25 ml glass vial was added 1.31 g (16.6 mmole) of ammonium bicarbonate followed by 0.83 g of deionized water and 2.36 g (16.6 mmol) of DYTEK™ A. To the resulting slurry was added 10 g of a 50% aqueous solution of xylose (33.3 mmol of xylose). The vial was capped and shaken to yield a homogeneous solution which remained fluid for at least 2 weeks.

Example 14

To a 25 ml glass vial was added 2.30 g of DYTEK™ 70 (13.9 mmol of 1,6 HMD). To this solution was added 10 g of a 50% aqueous solution of dextrose (27.8 mmol of dextrose). The vial was capped and shaken to yield a homogeneous solution which gelled within 3.5 hours.

Example 15

To a 25 ml glass vial was added 1.10 g (13.9 mmol) of ammonium bicarbonate followed by 2.76 g of DYTEK™ 70 (13.9 mmol of 1,6 HMD). To the resulting slurry was added 10 g of a 50% aqueous solution of dextrose (27.8 mmol of dextrose). The vial was capped and shaken to yield a homogeneous solution which remained fluid for at least 2 weeks.

The mol % of acid from the stabilizer based on total primary amine equivalents was, in the case of diprimary diamines, equal to the number of acid equivalents in the stabilizer divided by the number of equivalents of primary amine in the diprimary amine having two primary equivalents, per mole. As shown in Table 1, below, the xylose, 1,6 HMD solution of control Example 3 is less stable than the corresponding dextrose, 1,6 HMD formulation, in control Example 1. The addition of an organic acid such as HOAc and TFA in Examples 2 and 4, respectively, greatly improves the self life stability of a dextrose formulation; the TFA stabilizer has less of an impact on the more reactive xylose formulation in Example 4 vs. Example 3 than does the acetic acid on the dextrose formulations in Example 2 vs. Example 1. The xylose formulation is greatly stabilized by the addition of a mineral acid such as sulfuric acid, see Ex 5. The effectiveness of ammonium bicarbonate in Examples 7 to 9, 11, 13 and 15 suggests that the pKa of the acid should be selected so as to enable protonation of the amine and the acid should be present in an amount greater than 20 mol % based on total primary amine equivalents.

In each of Examples 1 to 15, in Table 1, below, the ratio of the number of equivalents of primary amine relative to the number of equivalents of carbonyl (as aldehyde or ketone) groups in the reducing sugar is approximately 1:1.

TABLE 1

Gelling Results by Formulation.

| Ex. | Reducing Sugar (g) | Diamine (g) | Total Water (g) | Stabilizer (g) | Time to Gellation | [1]H+/primary amine |
|---|---|---|---|---|---|---|
| 1* | ADM 97/71 10.7 | 1,6 HMD 2.5 | 9.9 | None | 5 hr. | 0.00 |
| 2 | ADM 97/71 10.7 | 1,6 HMD 2.5 | 9.9 | HOAc 1.3 | >2 weeks | 0.50 |
| 3* | Xylose 6.3 | 1,6 HMD 2.5 | 6.8 | None | <5 min. | 0.00 |
| 4 | Xylose 6.3 | 1,6 HMD 2.5 | 11.3 | TFA 2.4 | 1 hr | 0.34 |
| 5 | Xylose 6.6 | DYTEK 70 3.1 | 5.23 | H2SO4 1.3 | >2 weeks | 0.71 |
| 6 | ADM 97/71 10.8 | DYTEK 70 3.6 | 11.4 | Al(NO3)3.9H2O 4.1 | >2 weeks | 0.25 |
| 7 | Xylose 5.0 | DYTEK 70 2.76 | 5.83 | ABC 1.32 | >2 weeks | 0.50 |
| 8 | Xylose 5.0 | DYTEK 70 2.76 | 5.83 | ABC 1.05 | 30 min | 0.40 |
| 9 | Xylose 5.0 | DYTEK 70 2.76 | 5.83 | ABC 0.26 | <10 min | 0.10 |
| 10* | Xylose 5.0 | bis-CHA 2.36 | 6.01 | None | <3.5 days | 0.00 |
| 11 | Xylose 5.0 | bis-CHA 2.36 | 6.01 | ABC 1.31 | >2 weeks | 0.50 |

TABLE 1-continued

Gelling Results by Formulation.

| Ex. | Reducing Sugar (g) | Diamine (g) | Total Water (g) | Stabilizer (g) | Time to Gellation | [1]H+/primary amine |
|---|---|---|---|---|---|---|
| 12* | Xylose 5.0 | DYTEK A 1.93 | 5.83 | None | <3.5 days | 0.00 |
| 13 | Xylose 5.0 | DYTEK A 1.93 | 5.83 | ABC 1.31 | >2 weeks | 0.50 |
| 14* | Dextrose 5.0 | DYTEK 70 2.30 | 5.69 | None | 3.5 hrs | 0.00 |
| 15 | Dextrose 5.0 | DYTEK 70 2.30 | 5.69 | ABC 1.10 | >2 weeks | 0.50 |

[1]Equivalent Ratio;
*Control.

Examples. 16-25

Examples Related to Extenders

Stock Solution of Dextrose/1,6 HMD/ABC: 291.5 g of Dextrose were added to 291.5 g of water under mild heat till complete dilution. Separately, 71.5 g of water and 85.5 g of ABC were added to 208.25 g of a 60% solution of 1,6 HMD. Upon cooling of the dextrose solution, the two solutions were combined to form 948.25 g of a ~50% solids stock solution of dextrose/1,6 HMD/ABC. The equivalent ratio of primary amine groups to reducing sugar carbonyl groups was 1.33:1.

Stock Solution of Xylose/1,6 HMD/ABC: 291.5 g of Xylose were added to 291.5 g of water under mild heat till complete dilution. Separately, 71.5 g of water and 85.5 g of ABC were added to 208.25 g of a 60% solution of 1,6 HMD. Upon cooling of the xylose solution, the two solutions were combined to form 948.25 g of a ~50% solids stock solution of xylose/1,6 HMD/ABC. The equivalent ratio of primary amine groups to reducing sugar carbonyl groups was 1.11:1.

The formulations, shown in Table 2, below, were made by simple mixing of the stock solution with the ARBO SO1 via a magnetic stir bar on a stir plate for approximately 10 mins.

TABLE 2

Extended Stable Formulations:

| Ex. | Dextrose Stock | Xylose Stock | ARBO SO1 | Total | Time to Gelation |
|---|---|---|---|---|---|
| 16 | 100 g | | | 100 g | >2 weeks |
| 17 | 90 g | | 10 g | 100 g | >2 weeks |
| 18 | 80 g | | 20 g | 100 g | >2 weeks |
| 19 | 70 g | | 30 g | 100 g | >2 weeks |
| 20 | 50 g | | 50 g | 100 g | >2 weeks |
| 21 | | 100 g | | 100 g | >2 weeks |
| 22 | | 90 g | 10 g | 100 g | >2 weeks |
| 23 | | 80 g | 20 g | 100 g | >2 weeks |
| 24 | | 70 g | 30 g | 100 g | >2 weeks |
| 25 | | 50 g | 50 g | 100 g | >2 weeks |

Each of the formulations in Table 2, above, was shelf stable.

As shown in Tables 3, below, the formulations in Table 2, above, were applied to filter paper and tested for mechanical properties as described below. Binder add on was also reported.

A binder impregnated microfiber filter sheet (Whatman International Inc., Maidston, England, GF/A, catalog No. 1820 866, 20.3 cm×25.4 cm) was prepared by drawing the paper through a trough filled with ~300 grams of 12 weight % pre-mixed aqueous binder solution, sandwiching the soaked sample between two cardboard sheets to absorb excess binder, and pressing the two cardboard sheets with a Birch Bros. Padder at 68.9 Pa pressure and at a speed of 2.5 m/min.

The resulting sample was dried @ 90° C. for 90 seconds in a Mathis Oven that (vented with a devolatilizer) and then was cured in the same type of Mathis Oven for the time and at the temperature indicated in Tables 3 and 4, below, immediately after the initial drying. The cured filter paper was then cut into 2.54 cm×10.16 cm strips for tensile testing. Dry test strips were tested as follows. Each strip was mounted on pneumatic grips, and tested with crosshead speed of 2.54 cm/min. Each tensile strength was recorded as the peak force measured during parting or breaking each tested strip in two. Eight strips were tested per example. For wet testing, prior to testing, 8 test strips were immersed in 85° C. water for 30 minutes. These samples were then removed from the water, patted dry and immediately tested as per the dry test directions. The above procedure was repeated for all binders formulated in Table 2, with results tabulated in Tables 3 and 4.

% Add On: Determined as the wt. % of binder on substrate divided by the bare substrate weight after cure. The weight of the untreated substrate is taken prior to treatment with binder.

TABLE 3

Filter Paper Test Data at 210° C., 3 min

| Ex. | Stock | % ARBO | Add On | Dry (N) | StDev | Wet (N) | StDev |
|---|---|---|---|---|---|---|---|
| 16 | Dextrose | 0% | 14.4 | 50.7 | 1.6 | 37.4 | 0.9 |
| 17 | Dextrose | 10% | 15.4 | 59.6 | 1.3 | 34.2 | 1.0 |
| 18 | Dextrose | 20% | 14.8 | 58.3 | 1.7 | 24.5 | 0.9 |
| 19* | Dextrose | 30% | 15.2 | 56.0 | 1.1 | 17.3 | 0.7 |
| 20* | Dextrose | 50% | 16.3 | 52.0 | 1.0 | 8.9 | 0.8 |
| 21 | Xylose | 0% | 15.2 | 62.7 | 1.3 | 35.6 | 1.6 |
| 22 | Xylose | 10% | 16.9 | 63.6 | 0.7 | 35.1 | 1.0 |
| 23 | Xylose | 20% | 15.9 | 61.8 | 1.0 | 26.7 | 0.9 |
| 24* | Xylose | 30% | 15.9 | 62.7 | 1.0 | 17.3 | 0.9 |
| 25* | Xylose | 50% | 15.8 | 52.5 | 0.8 | 8.9 | 0.6 |

N: Newton;
*Comparative

TABLE 4

Filter Paper Test Data at 190° C., 3 min

| Ex. | Stock | % ARBO | Add On | Dry (N) | StDev | Wet (N) | StDev |
|---|---|---|---|---|---|---|---|
| 16 | Dextrose | 0% | 14.3 | 53.4 | 1.7 | 29.8 | 1.2 |
| 17 | Dextrose | 10% | 15.3 | 60.0 | 1.1 | 27.1 | 0.4 |
| 18 | Dextrose | 20% | 15.1 | 58.7 | 1.0 | 19.6 | 0.6 |
| 19* | Dextrose | 30% | 15.5 | 53.4 | 1.7 | 12.0 | 0.6 |
| 21 | Xylose | 0% | 15.7 | 57.8 | 1.2 | 34.7 | 0.8 |
| 22 | Xylose | 10% | 16.5 | 58.3 | 1.4 | 31.6 | 0.8 |
| 23 | Xylose | 20% | 14.2 | 60.0 | 1.2 | 23.1 | 0.8 |
| 24* | Xylose | 30% | 16.6 | 60.9 | 0.9 | 20.9 | 0.5 |

N: Newton;
*Comparative.

As shown in Tables 2, 3 and 4, above, according to the present invention, adding from 10 to 20 wt. % low cost extender (lignosulfonate), based on the total binder solids, allows one to maintain the stability of the system (Table 2) as well as the dry and wet strength mechanical properties of the binding system in Examples 16-18 and 21-24 of Tables 3 and 4. Going much above 20 wt. %, as shown in Examples 19-20 and 24-25 in Table 3, above, one is still able to maintain a stable system, however, the mechanical properties of wet strength begin to drop. Not shown in Table 4, above, the more lightly cured binder (cured at 190 deg. C. for 3 min) did not provide adequate dry and wet tensile strength in the 50 wt. % extended system and the data are not listed.

Examples 25-38

Effect on Cure of Fugitive Acid Stabilizers

Formulations as set forth in Table 5, below, containing fugitive acid stabilizers and comparative formulations were formed by adding to a 25 ml glass vial equipped with a stirring bar, the water and 1,6 HMD (hexamethylene diamine) charges. Next, the stabilizer was added slowly dropwise to this stirred solution. Finally, the dextrose charge was added and the resultant solution was stirred to assure homogeneity. In the table below, HOAc stands for acetic acid as glacial acetic acid and ABC stands for ammonium bicarbonate. Citric acid, acetic acid and ammonium bicarbonate stabilizers flash off in use and are considered fugitive stabilizers.

TABLE 5

Formulations with Fugitive Acid Stabilizers

| Ex. | Water (g) | Dextrose (g) | 1,6 HMD (g) | $H_2SO_4$ (g)** | $H_3PO_4$ (g)** | HCl (g)** | Citric acid (g) | HOAc (g) | ABC (g) |
|---|---|---|---|---|---|---|---|---|---|
| 26* | 6.66 | 6.00 | 3.33 | | | | | | |
| 27** | 7.85 | 6.00 | 3.33 | 1.27 | | | | | |
| 28** | 8.27 | 6.00 | 3.33 | 1.72 | | | | | |
| 29** | 8.05 | 6.00 | 3.33 | | 1.99 | | | | |
| 30** | 6.85 | 7.00 | 3.89 | | | 3.42 | | | |
| 31** | 6.75 | 7.00 | 3.89 | | | 3.91 | | | |
| 32** | 6.60 | 7.00 | 3.89 | | | 4.40 | | | |
| 33 | 8.88 | 6.00 | 3.33 | | | | 2.22 | | |
| 34 | 8.45 | 6.00 | 3.33 | | | | | 1.81 | |
| 35 | 8.70 | 6.00 | 3.33 | | | | | 2.07 | |
| 36 | 9.05 | 6.00 | 3.33 | | | | | | 2.38 |
| 37 | 9.35 | 6.00 | 3.33 | | | | | | 2.72 |
| 38 | 9.70 | 6.00 | 3.33 | | | | | | 3.06 |

*Comparative Example;
**Example does not contain a fugitive acid stabilizer

The formulations in Table 5, above, were allowed to sit at ambient temperature to determine their stability and were tested by dynamic mechanical analysis or DMA, described as follows:

DMA: A test used to measure cure rate. A small angle oscillatory strain was applied to a reacting sample and the resultant stress was decomposed into an "in phase" (G', solid-like response) and "out of phase" component (G", liquid-like response). The phase angle by which the stress response lags the strain is known as delta, d, and tan (d) is the ratio of G":G' For small applied strains, the system can be measured continuously through the liquid-solid transition. The instrument used was a TA Instruments DMA Q800, Model#2980 equipped with dual cantilever clamp (TA Instruments Inc., New Castle, Del.), with mathematical analysis conducted using TA Universal Analysis 2000 Software. The following parameters were used in testing:

Temp Ramp: 4° C./min from 30° C. to 250° C.

Substrate: 12.7 mm×34.0 mm Whatman® GF/B filter paper (2 strips as sandwich).

Sample Loading: 0.500 g of a 50 wt % solution (approx. 4 drops/strip of a 30 weight % aqueous solution of the reagent mixture).

Characteristic cure temperatures were analyzed by the following method in TA Universal Analysis 2000. On a storage modulus (G') versus temperature plot, points corresponding to the "signal maximum" of G' in the cure onset region and the cure final region were noted. Then the onset cure temperature, $T_{onset}$, was determined as the intercept of the line tangent to the signal maximum point and the line tangent to the inflection point using "Glass/Step Transition". The final cure temperature, $T_{final}$, was determined as the intercept of the horizontal line tangent to the point at peak modules (G') and the line tangent to the inflection point. Cure time was the time from onset to end of cure with a heating rate 4° C./min.

DMA and stability results are presented in Table 6, below.

TABLE 6

Cure Rate As Measured By DMA

| Ex. | pH | Stability (1 week) | Onset (° C.) | Final (° C.) | Cure Time (s) |
|---|---|---|---|---|---|
| 26* | 11.0 | Gelled | 117 | 137 | 300 |
| 27** | 7.9 | Stable | 151 | 166 | 225 |
| 28** | 7.7 | Stable | 155 | 170 | 225 |
| 29** | 7.0 | Stable | 140 | 159 | 285 |
| 30** | 6.9 | Stable | 167 | 185 | 270 |
| 31** | 6.7 | Stable | 176 | 190 | 210 |
| 32** | 6.6 | Stable | 170 | 185 | 225 |
| 33 | 7.3 | Stable | 146 | 171 | 375 |
| 34 | 7.3 | Stable | 132 | 159 | 405 |
| 35 | 7.1 | Stable | 138 | 176 | 570 |
| 36 | 8.6 | Stable | 116 | 135 | 285 |
| 37 | 8.5 | Stable | 114 | 131 | 255 |
| 38 | 8.5 | Stable | 114 | 132 | 270 |

*Comparative;
**Example does not contain a fugitive acid stabilizer

As shown in Table 6, above, all acid containing compositions are in fact stable after sitting at room temperature for 7 days, whereas the Example 26 composition without any acid was not stable after 7 days. All fugitive acid stabilizer containing Examples 33, 34, 35, 36, 37 and 38 enabled reduced onset cure temperature compared to the acid stabilized compositions in Examples 27, 28, 29, 30, 31 and 32. In comparison to the acid containing examples 27-32 that did not contain a fugitive acid stabilizer, the acetic acid (Ex. 34-35) markedly reduced onset cure temperature; and ammonium bicarbonate (Ex. 36, 37 and 38) dramatically reduced onset cure temperature without increasing cure time even in comparison to the comparative unstabilized Example 26 binder. The data were consistent throughout the tested range of proportions of the stabilizers. Accordingly, the fugitive acid stabilizers produced binders that enable reduced cure energy and cure at a lower temperature and/or cure in a reduced amount of time.

We claim:

1. A stable aqueous thermosetting binder composition with extended shelf life comprising one or more reducing sugar, one or more primary amine compound which is a diprimary diamine or a polypromary amine, and one or more stabilizer acid or salt having a pKa of 8.5 or less,
wherein the total solids content of the binder composition is 15 wt. % or higher,
further wherein, the number of equivalents of primary amine relative to the number of equivalents of carbonyl (as aldehyde or ketone) groups in the reducing sugar ranges from 0.125:1 or higher and up to 10:1 and,
still further wherein, the total amount of stabilizer used ranges from 5 to 200 mole %, based on the total moles of primary amine present in the binder.

2. The composition as claimed in claim 1, wherein the reducing sugar is a 5-carbon or a 6-carbon monosaccharide.

3. The composition as claimed in claim 1, wherein the diprimary diamine or polyprimary amine is chosen from, if a diprimary diamine, an aliphatic primary diamine, a cycloaliphatic primary diamine, an aromatic di-primary amine, and aminoguanidine and its salts, and, if a polyprimary amine, a polyethyleneimine, a (co)polymer of n-alkylamino (meth)acrylates, and polyguanides.

4. The composition as claimed in claim 1, wherein the pKa of the stabilizer acid or salt is 7.5 or less.

5. The composition as claimed in claim 1, wherein the stabilizer is (i) an organic stabilizer chosen from a monocarboxylic acid, a dicarboxylic acid, a fatty acid, an acid functional fatty acid ester compound, an acid functional fatty acid ether compound, and mixtures thereof, (ii) an inorganic stabilizer chosen from a mineral acid, a mineral acid amine salt, a mineral acid ammonia salt, and a Lewis acid, (iii) a fugitive acid stabilizer, or (iv) mixtures of any of the foregoing with a fatty acid, a fatty acid ester, a fatty acid ether compound.

6. The composition as claimed in claim 5, wherein the amount of the stabilizer is 20 mole % or more, based on the total moles of primary amine present in the binder.

7. The composition as claimed in claim 1, wherein the total solids content of the binder composition is 20 wt. % or higher.

8. The composition as claimed in claim 1, further comprising a lignosulfonate in amounts of up to 25 wt. %, based on the total binder solids.

9. A method of using the stable aqueous thermosetting binder composition as claimed in claim 1 comprising:
applying the binder composition to or mixing it with a substrate; and,
heating the thus treated substrates or mixtures to cure the binder.

10. The method as claimed in claim 9, wherein the substrate is fibers, slivers, chips, particles, films, sheets, wood, or woody materials or combinations thereof.

* * * * *